Patented Feb. 18, 1941

2,231,927

UNITED STATES PATENT OFFICE 2,231,927

MANUFACTURE OF ARTIFICIAL STRUCTURES AND OTHER USEFUL ARTICLES FROM CELLULOSE DERIVATIVES

Leon Lilienfeld, Vienna, Austria; Antonie Lilienfeld special administratrix of said Leon Lilienfeld, deceased No Drawing. Application February 10, 1936, Serial No. 63,280. In Great Britain February 14, 1935

4 Claims. (Cl. 18—54)

Cellulose ethers which are soluble in caustic alkali solution, but insoluble or only scarcely soluble in water and processes for making same and processes for converting them into shaped structures and other useful articles are described for the first time in my U. S. specifications Nos. 1,589,606, 1,683,831, 1,683,682 and in my U. S. patent application Ser. No. 521,022 (these specifications are concerned with the alkali-soluble alkyl derivatives of cellulose); further in my U. S. specifications Nos. 1,722,927 and 1,722,928 (these specifications relate to the alkali-soluble hydroxy-alkyl derivatives of cellulose); further in my U. S. specifications Nos. 1,682,292, 1,682,294 and 1,682,293 (these specifications deal with the alkali-soluble hydroxy-acid ethers of cellulose), and in my U. S. Patent 2,095,524 which deals with the alkali-soluble cellulose derivatives in which groups derived from halogen olefines are introduced into the cellulose molecule.

According to the working formulae used for their preparation, inter alia according to the degree of maturing given the alkali cellulose and/or the time of the reaction and/or the time allowed the reaction mass to stand before the reaction mass is worked up and/or to the temperature at which the reaction is conducted and/or to the proportions of the alkylating or hydroxy-alkylating agents or halogen-fatty acids used for the reaction, in my aforementioned processes cellulose derivatives form which either (a) Directly dissolve in caustic alkali solution at room temperature, or (b) Only partially dissolve therein, or (c) Remain undissolved in caustic alkali solution at room temperature.

Among the members of group (b) the proportion of the part which directly dissolves in caustic alkali solution at room temperature to the part which does not dissolve in caustic alkali solution at room temperature varies in my aforementioned processes within very wide limits, for instance between 40–90 per cent. of the portion that will dissolve to 60–10 per cent. of the portion that will not dissolve (see for example the relative examples of my U. S. specifications Nos. 1,683,682 and 1,683,831) and in many instances even between 10–20 per cent. of the part that will dissolve to 90–80 per cent. of the part that will not dissolve.

The members of group (b) may therefore, by digesting them in caustic alkali solution at room temperature and filtration, straining, centrifuging or the like, be separated into their constituents which will directly dissolve in caustic alkali solution at room temperature and their constituents which will not so dissolve in caustic alkali solution at room temperature, or they may be brought into solution completely in caustic alkali solution according to the process laid down in my British Patent 212,864, i. e. by contacting them with caustic alkali solution and cooling the thus obtained mixture to a temperature between plus 5° C. and minus 10° C. or lower and thereafter bringing the solution back to room temperature. (See for instance page 3, lines 62 to 71 of my British specification No. 212,864, where the making of solutions of alkali-soluble cellulose ethers by refrigeration is described for the first time.)

In many cases, the process of my British Patent 212,864 can be also used for the dissolving of the members of group (c) in caustic alkali solution.

Since the U. S. specifications set out in the first paragraph were published, some methods for the preparation of alkali-soluble cellulose ethers have been disclosed which however are based on the inventive principles underlying the U. S. specifications set out in the first paragraph and which, therefore, may be regarded as further examples of carrying the processes laid down in the said specifications into effect.

In addition, since the U. S. specifications set forth in the first paragraph appeared in print, also some alkali-soluble cellulose esters of organic acids (such as cellulose mono-esters of dicarboxylic acids, for example alkali-soluble mono-ester of phthalic acid or succinic acid or adipic acid or maleic acid or the like or an alkali-soluble cellulose acetate diglycollate or cellulose acetate propionate diglycollate or cellulose acetate thiodiglycollate or cellulose acetate thiodilactate or alkali-soluble esters of cellulose ethers, for example alkali-soluble ethyl cellulose phthallate or alkali-soluble ethyl cellulose diglycollate or the like) and some alkali-soluble cellulose esters of inorganic acids (for instance, alkali-soluble cellulose nitrate) and processes for making same have been described.

The working up of such ethers or esters of cellulose as are at least partially soluble in caustic alkali solution and which are insoluble or only scarcely soluble in water into shaped structures has been hitherto accomplished by giving the alkaline solutions of the said cellulose derivatives the desired shape and coagulating the shaped solutions with a solution of an acid or of an acid salt or with a solution of an acid containing an acid salt and/or a neutral salt.

My present invention is based on the observation that cellulose ethers which are soluble in caustic alkali solution, but insoluble or only sparingly soluble in water, can be converted into useful shaped structures by coagulating or precipitating a shaped solution of them by means of hot, warm or cold water.

It has hitherto been supposed that shaped structures could be produced from alkali soluble cellulose ethers only by means of coagulating baths containing substantial amounts of acid or acid salt or acid and salt, or by means of other coagulating baths known in the viscose art, namely, by the use of coagulating baths of which constituents thereof neutralize (and destroy) the caustic alkali present in the solution of the alkali soluble cellulose ether.

Hence, heretofore, such coagulating agents have been generally used for the coagulation of shaped solutions of alkali-soluble cellulose ethers or esters as are able to neutralise the alkali present in the solutions.

A particularly remarkable advantage of the invention over the processes in which acid coagulating agents are used for the making of artificial structures from alkali-soluble cellulose ethers and/or esters consists in the fact that, contrary to these processes, the present process admits of a recovery of the caustic alkali contained in the solutions of the cellulose ethers and/or esters, and, thus, of reintroducing the caustic alkali into the process in a circular course. This advantage is not to be undervalued, considering that the proportions of caustic alkali present in the solutions of alkali-soluble cellulose ethers and/or esters are rather large and considering that, in the relative processes known hitherto in which mainly dilute sulphuric acid free from, or containing sodium sulphate and/or another sulphate, is used as coagulating bath the caustic soda contained in the cellulose ether or cellulose ester solution is converted into the more or less worthless sodium sulphate and is therefore simply lost.

A further favourable feature of the present invention is the trifling cost of water which is one of the cheapest materials in existence.

Although, at bottom, the carrying out of the invention in practice is comparatively simple, the working conditions may be varied within wide limits. It is therefore not intended to limit the invention to the following description and the examples of the practical execution of the process, i. e. to the particulars given therein as to the types of the alkali-soluble cellulose ethers and/or esters (i. e. as to the nature of the radical or radicals introduced into the cellulose molecule and as to the representatives set forth by way of examples for the various types of cellulose ethers and/or cellulose esters and as to the processes or methods for the production of the cellulose ethers and/or esters), as to the processes or methods and temperatures of the preparation of the cellulose ether—and/or cellulose ester solutions, as to the quantitative composition of the cellulose ether—and/or cellulose ester solutions, as to the substances which optionally may be added to the cellulose ether—or cellulose ester solutions as to the methods of shaping the cellulose ether—and/or cellulose ester solutions, as to the manner in which these solutions are contacted with the water, as to the substances which optionally may be added to the cellulose ether—and/or cellulose ester solutions and/or to the water, as to the temperature of the water, as to the after-treatment of the coagulated shaped artificial structures or other useful articles, etc., etc.

The practical carrying out of the invention comprises dissolving in caustic alkali solution at least one simple or mixed cellulose ether or a cellulose ester which ether or ester is at least partially soluble in caustic alkali solution and which ether or ester is insoluble or only scarcely soluble in water, giving the solution oppropriate shape and coagulating the shaped solution by means of hot, warm or cold water. Thereupon, if desired, the coagulated shaped structure may be washed and, optionally after being treated with an acid medium and re-washed, dried.

As far as supportless shaped artificial structures, such as artificial threads, artificial hair, artificial straw, film, bands, strips or the like are concerned, the shaping and coagulating may be effected by extruding the cellulose ether—or cellulose ester solutions through suitably formed openings into hot or warm or cold water. The invention embraces also making such shaped structures as are combined with a rigid or pliable support, such as coatings, layers and impregnations of any kind, dressing of fabrics, textile printing, book cloth, tracing cloth, sizing of yarn, paper-sizing, paper-like surfacing, etc. In this case the shaping and coagulating may be accomplished by wholly or partially coating, impregnating, printing or otherwise covering or imbueing the cellulose ether—or ester solution upon a rigid or pliable support and, with or without intermediate drying, treating the material with hot, warm or cold water. This can be done by either introducing the material into hot, warm or cold water or by spraying hot, warm or cold water or even steam on the material or conducting the material through a mist of water or through steam or by any other method of applying water to a rigid or pliable support.

It is to be understood that in the present invention alkali-soluble cellulose ethers may be used which are made by any process or method whatever, for instance according to any one of the processes and methods described in my U. S. specifications Nos. 1,589,606, 1,683,831, 1,683,682, 1,722,927, 1,682,292 and 1,682,294, or according to any one of the processes and methods described in my U. S. applications Ser. Nos. 521,022 and 521,026, or according to any other process or method suitable for the preparation of such cellulose ethers as are completely or at least partially soluble in caustic alkali solution at room temperature and at a temperature between room temperature and 0° C. or at 0° C. or at a temperature below 0° C., or such cellulose ethers as cannot directly be completely or even partially dissolved in caustic alkali solution at room temperature, but as can be completely or at least partially dissolved therein at a temperature between room temperature and 0° C. or at 0° C. or at a temperature below 0° C., for instance at minus 5° C. to minus 10° C. or lower, or such cellulose ethers as cannot be completely or even partially dissolved in caustic alkali solution at room temperature or at a temperature between room temperature and 0° C. or at 0° C., but as can be partially or completely dissolved therein only with the aid of cooling to a temperature below 0° C., for example to minus 5° C. to minus 10° C. or lower.

In other words: In the present invention not only such alkali-soluble cellulose ethers as can be prepared by the processes and methods described in the specifications set forth in the foregoing paragraph, but also such alkali-soluble cellulose ethers may be used as are prepared by any other process or method suitable for the preparation of cellulose ethers which are at least partially soluble in caustic alkali solution or can be made soluble therein by application of low temperatures, for example by the process described in my British Patent 212,864.

It is further to be understood that, in the present invention either simple or mixed alkali-soluble cellulose ethers can be employed. As mixed ethers the following may be named by way of example:

*Mixer ethers.*—Cellulose derivatives containing in their molecule two different alkyl groups, cellulose derivatives containing in their molecule two different hydroxy-alkyl groups, cellulose derivatives containing in their molecule an alkyl group and a hydroxy-alkyl group, cellulose derivatives containing in their molecule two different hydroxy-acid residues, cellulose derivatives containing in their molecule an alkyl group and a hydroxy-acid residue, cellulose derivatives containing in their molecule a hydroxy-alkyl group and a hydroxy-acid residue and so on.

Any suitable softening agents, such as glycerine or a glycol or a sugar, such as glucose or a soap or Turkey-red oil, or a drying or non-drying oil, or a halogen derivative of a di- or polyvalent alcohol, particularly a halohydrin, such as a dichlorohydrin or a monochlorohydrin or ethylene chlorohydrin, in short, in so far as it is compatible with the alkali-soluble cellulose ethers, any substances known in the viscose art as addition to viscose may be added to the solutions of the alkali-soluble cellulose ethers prior to their conversion into shaped artificial structures according to the present invention.

The temperature of the coagulating water may be varied within wide limits, for example from 5° C. up to the boiling point. Thus the coagulating bath may be used at room temperature or below room temperature, for example at 8 to 10° C. or above room temperature, for instance at 30 to 45° C. or at 60° C. or at 90° C.

The coagulating water may contain a small proportion of one or more organic or inorganic substances, which may or may not have a coagulating effect on the shaped solution, for example glycerine or glycol, or a mono-hydric alcohol, or a phenol, or an organic or an inorganic acid, or a neutral or acid salt of such acid, with an organic or inorganic base or the like. If the additional substance is a coagulant for viscose it should be present in a proportion insufficient for coagulating a normal viscose into a useful shaped structure.

After having been at least partly coagulated by water in the presence or absence of an additional substance as aforesaid, the structure may be dried directly or it may be first washed with water and then dried, or it may be washed with water and then treated with, for instance conducted through, a bath containing an acid or a salt or an acid and a salt and then re-washed and dried, or it may be directly introduced into (for instance run through) a bath containing an acid or a neutral salt or acid salt or alkaline salt or an acid and a neutral or acid salt or both or into any coagulating or precipitating bath known from the viscose art and then washed and dried.

After being washed or washed and dried, the artificial structures produced according to the invention may be treated with any softening or lubricating agent known in the viscose art.

In order to explain the nature of the present invention, the following specific examples are set forth. As stated above, the invention is not limited to these examples; the parts are by weight.

*Example I*

1000 parts of air-dry cotton linters or wood-pulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3500 parts and comminuted at 10 to 20° C. for 2 to 3 hours in a Werner-Pfleiderer shredder or another suitable comminuting machine or in a Werner-Pfleiderer xanthating machine whose blades may be dentated. Thereupon 100 to 200 parts of ethylene chlorohydrin or 100 to 280 parts of glycerol-alpha-monochlorohydrin or 100 to 300 parts of di-methyl sulphate or di-ethyl sulphate or mono-chloroacetic acid (for example in the form of a concentrated aqueous solution of sodium monochloro-acetate) or 55 to 120 parts of ethylene oxide or 75 to 150 parts of propylene oxide or 90 to 180 parts of glycid, are added in one or several portions and the reaction mass is shredded for about 3 hours at 18 to 21° C.

The product of the reaction contained in the thus obtained reaction mass can be brought into solution in various ways, the more important being the following:

(a) The crude reaction mixture as such or after having been neutralised or acidified is washed with water and then pressed and, after the water content of the pressed product has been determined, directly mixed with so much caustic soda solution of appropriate strength as to yield a mixture containing about 6 to 8 per cent. of the cellulose ether and 6 to 10 per cent. of caustic soda, which mixture is continuously or temporarily stirred or kneaded or otherwise agitated until at least partial solution occurs. If necessary complete solution may be brought about by cooling the mixture to a temperature below room temperature, for example to a temperature between room temperature and 0° C. or to 0° C. or to a temperature of about minus 5 to minus 10° C., and bringing the solution back to room temperature or to any temperature between 0° C. and room temperature.

The washed and pressed product may also, optionally after having been dehydrated with alcohol and, if desired, exhausted with ether, be dried and then dissolved as described above.

(b) The crude reaction mass is, without being washed or otherwise treated, mixed with such quantity of a caustic soda solution of appropriate strength as to yield a solution or suspension containing about 4 to 8 per cent. of the cellulose ether and 6 to 10 per cent. of caustic soda and brought into solution as described under (a).

(1) The solution (to which a softening agent, such as an oxy-trimethylene-sulphide or glycerine or Turkey-red oil or another sulphonated oil or a sugar may be added, or to which a dyestuff or the like may be added) is, after having been filtered, spread on a glass plate and introduced into one of the following baths:

(a) Water, or
(b) Water containing 0.5 per cent. of $H_2SO_4$ or hydrochloric acid, or
(c) Water containing 0.2 per cent. of sulphuric or hydrochloric acid, or
(d) Water containing 0.03 to 0.1 per cent. of sulphuric or hydrochloric acid, or (e) Water containing 1 per cent. of anhydrous sodium sulphate, or (f) Water containing 1 per cent. of anhydrous sodium sulphate and 0.03 to 0.1 per cent. of sulphuric or hydrochloric acid, or (g) Water containing 1 per cent. of sodium bisulphate, or (h) Any one of the baths set forth above under (a) to (g) to which 1 to 10 per cent. of glucose or glycerine or methanol or ethanol or soap or Turkey-red oil or the like have been added. To the solution to be worked up according to this paragraph, an insoluble material can be also added, for example a finely divided pigment such as a bronze powder free from aluminum, or finely divided mica, etc.

The temperature of the coagulating baths set forth above under (a) to (h) may be 100° C. or 90 to 99° C. or 80 to 89° C. or 60 to 79° C. or 40 to 59° C. or 20 to 39° C. or 12 to 19° C., in short any degree between 2 and 100° C.

The solidified film is washed with water and dried in the usual manner.

(2) The cellulose ether solution is in a known manner evenly spread on the surface of the drum of a film making machine based on the drum principle, part of the drum being immersed in any one of the baths set forth above under (a) to (h). The diameter of the drum must be so large that, when the drum rotates at the desired speed, the film is sufficiently solidified at the time of its having to leave the surface of the drum in order to undergo the contemplated after-treatment or treatments.

The solidified film is in a known manner washed with hot or warm or cold water and then dried.

(3) Mode of procedure as in (2), but with the difference that, instead of being distributed on a drum, the cellulose ether solution is by means of a suitable appliance coated on an endless band having a smooth surface, which endless band is immersed in one of the coagulating baths set out above under (a) to (h).

(4) The process is conducted as in any one of the paragraphs (1) to (3), but with the exception that, after having been washed for a shorter or longer time, the film is treated with a 2 to 10 per cent. sulphuric acid or 1 to 5 per cent. hydrochloric acid or with a bath containing 2 to 10 per cent. of sulphuric acid and 10 to 16 per cent. of sodium sulphate and/or 12 to 16 per cent. of magnesium sulphate at room temperature or at 40 to 50° C. or with sulphuric acid of 30 to 70 per cent. strength at room temperature or at 5° C. or at 0° C. or at minus 5° C. or with any other bath or system of two baths known from the viscose art and then washed and finished in the usual way.

(5) The process is conducted as in any one of the paragraphs (1) to (3), but with the variation that, on leaving the surface of the drum, the film is directly treated with a 2 to 10 per cent. sulphuric acid or 1 to 5 per cent. hydrochloric acid or with a bath containing 2 to 10 per cent. of sulphuric acid and 10 to 16 per cent. of sodium sulphate and/or 12 to 16 per cent. of magnesium sulphate at room temperature or at 40 to 50° C. or with sulphuric acid of 30 to 70 per cent. strength at room temperature or at 5° C. or at 0° C. or at minus 5° C. or with any other bath or system of two baths known from the viscose art and then washed and finished in the usual way.

(6) The process is conducted as in paragraph (4) or (5), but with the difference that, instead of the baths set forth therein, one of the following baths is used for the after-treatment of the film coming from the washing water (paragraph 4) or the drum (paragraph 5):

(a) sodium carbonate solution of 28 to 30 per cent. strength at 45 to 90° C., or (b) a bath containing 23 to 24 per cent. of sodium carbonate and 15 to 16 per cent. of sodium sulphate at 45 to 80° C., or (c) a solution of ammonium sulphate of 25 to 30 per cent. strength having a temperature of 16 to 25° C., or (d) a solution of ammonium sulphate of 25 to 30 per cent. strength having a temperature of 40 to 50° C., or (e) a solution of sodium sulphate of 25 per cent. strength having a temperature of 50 to 60° C., or (f) a solution containing two or more of the salts set out sub (a) to (e), or (g) a solution containing 3 per cent. of $H_2SO_4$ and 8 per cent. of $Na_2SO_4$.

(7) The process is conducted as in paragraph (1) or (2), but with the exception that, on leaving the drum, the film is directly dried.

The film may be treated before or after drying with a solution of glycerol (for instance of 4 to 10 per cent. strength), or glycol.

As a matter of course, the film may also be treated with any of the known moisture-proofing or water-proofing agents or compositions.

The film may be treated either in the course of its manufacture or in the finished state with a hardening agent, such as formaldehyde or the like.

(8) The cellulose ether solution is pressed through a spinning nozzle having 90 to 100 holes (diameter about 0.08 mm.) into a spinning funnel through which a stream of one of the coagulating baths set forth above in (1) under (a) to (h) slowly runs. On leaving the funnel the thread is conducted through one of the baths set out in (6) sub (a) to (g) and thereafter wound up or reeled and washed and finished in the usual manner.

If desired, the extensibility of the artificial threads may be increased by treating them with shrinking agents, for instance according to any one of the processes described in my U. S. specifications Nos. 1,989,098, 2,001,621, 1,989,099, 1,989,100 and 1,989,101.

How staple fibre may be produced according to the present process follows automatically from the foregoing examples.

(9) A woven fabric, such as cotton fabric is provided by means of a suitable machine, for example a back-filling machine or a padding machine or a spreading machine, with one or more coatings of a solution prepared by method (a) or (b), to which solution a filling material such as talc or china clay or zinc white or a dye-stuff or pigment, such as a lake or lampblack or ocher or mica and/or a softening agent, for instance an oxytrimethylene sulphide (see my U. S. specification No. 1,018,329) or a soap or Turkey-red oil or a drying or non-drying oil, etc., etc., may be added. The coated or impregnated or filled material is then introduced directly or after intermediate drying and/or steaming, into one of the coagulating baths set forth in (1) under (a) to (h) and is then washed and dried.

The textile material may be treated before or after drying with a softening agent, such as a soap or Turkey-red oil or glycerol or the like.

(10) The procedure is as in (9), but with the exception that the solution is mixed with a solution of starch or dextrin or any other colloid known in the finishing art.

(11) The process is conducted as in paragraph (9), or (10), but with the exception that, after having been washed for a shorter or longer time, the coated or impregnated or filled fabric is treated with a 2 to 10 per cent. sulphuric acid or 1 to 5 per cent. hydrochloric acid or with a bath containing 2 to 10 per cent. of sulphuric acid and 10 to 16 per cent. of sodium sulphate and/or 12 to 16 per cent. of magnesium sulphate at room temperature or at 40 to 50° C. or with sulphuric acid of 30 to 70 per cent. strength at room temperature or at 5° C. or at 0° C. or at minus 5° C. or with any other bath or system of two baths known from the viscose art and then washed and finished in the usual way.

(12) The process is conducted as in paragraph (9) or (10), but with the variation that, on leaving the coagulating bath, the coated or impregnated or filled fabric is directly treated with a 2 to 10 per cent. sulphuric acid or 1 to 5 per cent. hydrochloric acid or with a bath containing 2 to 10 per cent. of sulphuric acid and 10 to 16 per cent. of sodium sulphate and/or 12 to 16 per cent. of magnesium sulphate at room temperature or at 40 to 50° C. or with sulphuric acid of 30 to 70 per cent. strength at room temperature or at 5° C. or at 0° C. or at minus 5° C. or with any other bath or system of two baths known from the viscose art and then washed and finished in the usual way.

(13) The process is conducted as in paragraph (11) or (12), but with the difference that, instead of the baths set forth therein, one of the following baths is used for the after-treatment of the coated, impregnated or filled fabric leaving the washing water (paragraph 11) or the coagulating bath (paragraph 12):

(a) sodium carbonate solution of 28 to 30 per cent. strength at 45 to 90° C., or (b) a bath containing 23 to 24 per cent. of sodium carbonate and 15 to 16 per cent. of sodium sulphate at 45 to 80° C., or (c) a solution of ammonium sulphate of 25 to 30 per cent. strength having a temperature of 16 to 25° C., or (d) a solution of ammonium sulphate of 25 to 30 per cent. strength having a temperature of 40 to 50° C., or (e) a solution of sodium sulphate of 25 per cent. strength having a temperature of 50 to 60° C.

(14) The process is conducted as in any one of the paragraphs (9) to (13), but with the exception that measures are taken towards incorporating with the final material deposited in or on the fibres of the fabric gas bubbles or hollow spaces. This may be done in a known manner by dispersing or otherwise distributing a gas, such as air or hydrogen or nitrogen or the like, in the cellulose ether solution.

(15) The process is conducted as in any one of the paragraphs (9) to (14), but with the difference that, before being applied to the fabric, the cellulose ether solution is converted into a lather according to the process described in my U. S. patent application Ser. No. 618,804.

Examples for sizing yarn follow automatically from paragraphs (9) to (15).

(16) A solution prepared by method (a) or (b) is mixed with a dye-stuff or with a pigment, such as a lake or ocher or lampblack or zinc white or finely divided mica and then printed in a rouleaux printing machine or stencilled on a cotton fabric. After being printed, the cotton fabric is, if desired after being dried, introduced into one of the coagulating baths set out in (1) under (a) to (h) and, after having been run through the bath or the baths, washed and dried, or treated as described in any one of the paragraphs (11) to (13).

(17) A solution prepared according to method (a) or (b) is used for the pasting together of two or more sheets of paper or card boards or cotton fabrics, the materials pasted together being then, if desired after intermediate drying, introduced into one of the coagulating baths set out above in (1) under (a) to (h) and then after-treated according to any one of the paragraphs (9) to (13).

(18) Thick plates can be made by shaping concentrated solutions or pastes of the cellulose ethers in caustic alkali solution and, optionally after intermediate drying, treating them with one of the coagulating baths set out above in (1) under (a) to (h) and after-treating them according to any one of the paragraphs (9) to (13).

In any and all items (1) to (18) of this example the coagulating bath or baths may be kept in permanent circulation in the usual manner.

*Example II*

The process is conducted as in Example I, but with the difference, that, instead of the amounts of etherifying agents there mentioned, 200 to 400 parts of ethylene chlorohydrin or 150 to 600 parts of glycerol alpha-monochlorohydrin or 300 to 500 parts of di-methyl sulphate or di-ethyl sulphate or monochloroacetic acid (for example in the form of a concentrated aqueous solution of monochloroacetate) or 120 to 240 parts of ethylene oxide or 150 to 300 parts of propylene oxide or 180 to 360 parts of glycid are used for the preparation of the cellulose ether.

*Example III*

The process is conducted as in Example I, but with the exception that, instead of the etherifying agents there mentioned a mixture of 100 to 200 parts of ethylene chlorohydrin or of 100 to 200 parts of glycerol alpha-monochlorohydrin or of 55 to 120 parts of ethylene oxide or of 75 to 150 parts of propylene oxide or of 90 to 180 parts of glycid and 100 to 200 parts of di-ethyl sulphate or di-methyl sulphate or a mixture of 100 to 200 parts of di-methyl sulphate and 100 to 200 parts of di-ethyl sulphate, or a mixture of 100 to 200 parts of ethylene chlorohydrin or of 100 to 200 parts of monochlorohydrin or of 100 to 200 parts of di-methyl sulphate or di-ethyl sulphate or of 55 to 120 parts of ethylene oxide or of 75 to 150 parts of propylene oxide or of 90 to 180 parts of glycid and 100 to 300 parts of monochloroacetic acid (for example in the form of sodium monochloroacetate) is used in the preparation of the cellulose ether.

*Example IV*

The process is conducted as in Example I, but with the difference that, instead of the etherifying agents there mentioned a mixture of 50 parts of ethylene chlorohydrin or of 70 parts of monochlorohydrin or of 30 to 40 parts of ethylene oxide or of 70 to 80 parts of propylene oxide or of 80 to 120 parts of glycid and 100 to 200 parts of di-ethyl sulphate or di-methyl sulphate or 100 to 300 parts of monochloroacetic acid (for example in the form of sodium monochloroacetate), or a mixture of 50 to 100 parts of di-methyl sulphate and 100 to 200 parts of di-ethyl sulphate or 100 to 300 parts of monochloroacetic acid (for example in the form of sodium monochloroacetate), or a mixture of 50 to 100 parts of di-ethyl sulphate or of di-methyl sulphate and 100 to 300 parts of monochloroacetic acid (for example in the form of sodium monochloroacetate) is used in the preparation of the cellulose ether.

Example V

The process is conducted as in Example I, but with the exception that, instead of the etherifying agents there mentioned, a mixture of 25 to 50 parts of ethylene chlorohydrin or of 30 to 60 parts of monochlorohydrin or of 20 to 30 parts of ethylene oxide and 50 parts of di-ethyl sulphate or di-methyl sulphate or 50 parts of monochloroacetic acid (for example in the form of sodium monochloroacetate), or a mixture of 25 to 50 parts of di-methyl sulphate and 50 parts of di-ethyl sulphate or monochloroacetic acid (for example in the form of sodium monochloroacetate) or a mixture of 25 to 50 parts of di-ethyl sulphate or di-methyl sulphate and 50 parts of monochloroacetic acid (for example in the form of sodium monochloroacetate) is used in the preparation of the cellulose ether.

Example VI

The process is carried out as in any one of the Examples I to V, but with the exception that the etherifying operation is conducted at 5 to 10° C.

Example VII

The process is conducted as in any one of the Examples I to VI, but with the difference that the alkali cellulose used in the preparation of the cellulose ether is allowed to mature for 12 to 96 hours at 15 to 25° C. With increased time of maturing the solubility of the cellulose ether in caustic alkali solution at room temperature improves in many cases in which unmatured alkali cellulose or alkali cellulose that has been matured for a short time yields a product that is incompletely soluble or insoluble at room temperature.

Example VIII

The process is conducted as in any one of the Examples I to VII, but with the exception that in the preparation of the cellulose ether after the 3 hours' stirring, kneading or shredding provided for in I, the reaction mass is allowed to stand at room temperature for 20 to 96 hours. With extended time of reaction the solubility of the cellulose ether in caustic alkali solution at room temperature improves in many cases in which a short time of reaction yields a product that is incompletely soluble or insoluble at room temperature.

Example IX

The process is conducted as in any one of the Examples I to VIII, but with the difference that the cellulose ethers used in these examples are in the form of the crude reaction masses (when necessary with addition of some concentrated caustic alkali solution or solid caustic alkali in replacement of the caustic alkali used up in the reaction, or in excess over this amount if desired) or in the isolated form, i. e. in the form of the washed and, optionally dried, reaction product or in the purified form, treated in presence of alkali with 70 to 150 parts of propyl chloride or 100 to 600 parts of benzyl chloride or with 50 to 200 parts of ethyl chloride or with 40 to 180 parts of methyl chloride at 50 to 80° C. and then used as cellulose ether according to the Example I (see items 1 to 18).

Example X

The process is conducted as in any one of the Examples I to IX, but with the exception that instead of to 3000 to 3500, the alkali cellulose used in the preparation of the cellulose ether is pressed to 2000 parts.

Example XI

The process is conducted as in any one of the Examples I to IX, but with the exception that, instead of to 3000 to 3500, the alkali cellulose used in the preparation of the cellulose ether is pressed to 1300 to 1600 parts.

Example XII A to H

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3500 parts and comminuted at 10 to 18° C. for 2 to 3 hours in a Werner-Pfleiderer shredder or another suitable comminuting machine. Thereupon the alkali cellulose is placed in a rotating autoclave or an autoclave provided with a stirring device, 200 parts of precooled ethyl chloride are added, and the material is heated to 60 to 80° C. and kept at this temperature for 12 to 24 hours.

The product of the reaction is dissolved in a similar manner as described in Example I and the solution worked up into artificial structures as described in Example I under (1) to (18).

B. The process is conducted as in A, but with the difference that, instead of 200 parts, 300 to 1500 parts of ethyl chloride are used in the preparation of the cellulose ether.

C. The process is conducted as in A, but with the exception that, instead of 200 parts, 75 to 100 parts of ethyl chloride are used in the preparation of the cellulose ether.

D. The process is conducted as in A, but with the exception that, instead of 200 parts of ethyl chloride, a mixture of 50 parts of ethyl chloride and 50 to 200 parts of ethylene chlorohydrin or 25 to 140 parts of ethylene oxide or 100 to 200 parts of di-methyl sulphate or 100 to 200 parts of methyl chloride or 100 to 300 parts of benzyl chloride or of monochloroacetic acid (for example in the form of sodium monochloroacetate) is used.

E. The process is carried out as in any one of the A to D, but with the difference that the etherifying operation is conducted at 50° C.

F. The process is carried out as in any one of the A to D, but with the difference that the etherifying operation is conducted at 95° C.

G. The process is conducted as in any one of the A to F, but with the exception that in the etherifying operation the duration of the heating is only 3 to 6 hours.

H. The process is conducted as in any one of the A to G, but with the difference that the alkali cellulose is allowed to mature for 12 to 96 hours or longer.

If there is no excess of ethyl chloride over the proportion calculated on the proportion of NaOH contained in the alkali cellulose, the etherifying reaction may be conducted at a temperature exceeding 100° C., for example at 110 to 130° C. or higher.

Example XIII A to H

The process is conducted as in any one of the Examples XII A to H, but with the difference that, instead of to 3000 to 3500 parts, the alkali cellulose used in the preparation of the cellulose ether is pressed to 2000 parts.

Example XIV A to H

The process is conducted as in any one of the Examples XII A to H, but with the exception that, instead of to 3000 to 3500 parts, the alkali cellulose used in the preparation of the cellulose ether is pressed to 1350 to 1600 parts.

Example XV

Any one of the ethyl celluloses obtained in the Examples XII A to C and E to H, XIII A to C and E to H or XIV A to C and E to H may be hydroxy-alkylated in the following manner and the thus obtained ethyl-hydroxy-alkyl cellulose used as cellulose ether for making artificial structures according to the present process:

The NaOH content of the crude reaction mixture resulting from the ethylating operation in any one of the Examples XII A to C and E to H, XIII A to C and E to H or XIV A to C and E to H is determined by analysis, whereupon, optionally after compensating the amount of NaOH used up in the alkylating reaction by supplying to the reaction mixture the equivalent or a larger quantity of NaOH in the form of powder or of a strong solution, for instance of 30 to 50 per cent. strength, the reaction mixture is treated with 50 to 150 parts of ethylene chlorohydrin or with 70 to 210 parts of glycerol alpha-monochlorohydrin or with 25 to 75 parts of ethylene oxide or with 32 to 100 parts of propylene oxide as described in any one of the Examples I to VIII for alkali cellulose.

The thus obtained ethyl-hydroxy-ethyl cellulose or ethyl-1:2-dehydroxy-propyl cellulose or propyl cellulose is dissolved as described in Example I (method (a) or (b)) and the thus obtained solution used as cellulose ether solution as described in Example I sub (1) to (18).

Example XVI

The process is conducted as in Example XV, but with the exception that not the crude, but the washed and optionally dried reaction product of any one of the Examples XII A to C and E to H, or XIII A to C and E to H, or XIV A to C and E to H is hydroxy-alkylated.

For this purpose the washed ethyl cellulose resultant from any one of the examples set forth in the foregoing paragraph which, if desired, may be dried, is steeped in an excess of a caustic soda solution of such strength as, together with the water (if any) adhering to the ethyl cellulose, to yield a caustic soda solution of 18 per cent. strength and the thus obtained product pressed down to 3000 to 4000 parts. The press cake is then shredded in the usual manner and then hydroxy-alkylated and worked up as described in Example XV.

Instead of being made by steeping the ethyl cellulose in an excess of caustic soda solution and removing the excess by pressing, the alkali ethyl cellulose may be prepared by mixing the washed or washed and dried ethyl cellulose in a mixing apparatus, for example in a Werner-Pfleiderer xanthating machine or a shredder with such an amount of a caustic soda solution of appropriate strength as together with the water (if any) adhering to the ethyl cellulose to yield 2000 to 3000 parts of a caustic soda solution of 18 per cent. strength.

Instead of being prepared by steeping the cellulose in an excess of caustic alkali solution and removing the excess by pressing, in any one of the preceding examples the alkali cellulose may be prepared by mixing the cellulose in a suitable mixing apparatus, for example a shredder or a kneading machine or a mill or a disintegrator or an edge runner or the like with the amount of caustic soda solution corresponding with the quantity remaining in the alkali cellulose used in the relative examples after pressing. The mixing of the cellulose with the caustic alkali solution may be conducted at room temperature or at a temperature above room temperature, for example at 24 to 30° C., or with cooling, for example to 15° or 10° C. or lower. The time of mixing may be varied within wide limits, for example from 1 hour to 24 hours or longer.

Instead of the cellulose ethers used in the foregoing examples cellulose esters which are at least partially soluble in caustic alkali solution and which are insoluble or only scarcely soluble in water may be used.

In the foregoing examples, any excess of the etherifying agents which has not been used in the etherifying reaction may be recovered by condensation or distillation.

In the foregoing examples, instead of cellulose, a conversion product of cellulose may be used as parent material—for instance, a cellulose hydrate or a hydrocellulose produced by chemical action on cellulose, such as mecerisation with subsequent washing and, if desired, drying; or by treating with a strong inorganic or organic acid or a mixture of both; or by heating with a dilute solution of a mineral acid; or by treatment with a zinc halide; or by a mechanical process, such as grinding in presence of water or the like; or an oxy-cellulose—in short any body of the cellulose group which has been proposed for the manufacture of viscose or of any other cellulose derivatives or compounds or of ammoniacal-copper-oxide-cellulose.

If feasible or expedient, in the foregoing examples, instead of the halogenated etherifying agents used therein, equivalent quantities of the corresponding brominated or iodinated reagents (for example alkyl bromides or alkyl iodides or monobromohydrin or monoiodohydrin or ethylene bromohydrin or ethylene iodohydrin or bromo-acetic acid or iodo-acetic acid, etc.) may be used.

If feasible or expedient, in the foregoing examples, instead of the alkylating or hydroxy-alkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or propylene chlorohydrin or butylene chlorohydrin.

If feasible or expedient, instead of ethylene oxide or propylene oxide or glycid, other alkylene oxides, such as butylene oxide, in short all suitable compounds which contain an ethylene oxide ring can be used in the foregoing examples.

If feasible or expedient, instead of alkyl halides or di-alkyl sulphates, equimolecular amounts of their substitution or addition derivatives, for example halogen alkyl amines, such as halogen alkyl-dialkyl amines or their hydrochlorides can be employed in the foregoing examples.

If feasible or expedient, in the foregoing relative examples, relating to hydroxy-acid derivatives of cellulose, instead of the chloroacetic acid, the equimolecular quantity of an ester of chloroacetic acid, for example methyl- or ethyl-chloroacetate, or a halogen derivative of a homologue of acetic acid, for instance alpha-chloropropionic acid or alpha-chloro-isobutyric acid or alpha-bromo-propionic acid or alpha-bromo-isobutyric acid or the like or an alkali salt or an ester thereof may be employed.

If desired, the extensibility of the shaped structures, such as threads or film or coatings or the like produced according to the present invention may be increased by treating them either in the course of their manufacture, for example after coagulation and washing or in the finished wet or dry state with suitable shrinking agents, for example with some of the shrinking agents mentioned in my U. S. specifications Nos. 1,989,098, 2,001,621, 2,004,876, 1,989,100, 1,989,101 and 2,004,875.

As a guiding line with regard to the question whether or not the alkali cellulose should be allowed to mature before being brought together with the etherifying agent or agents may among others, serve the desired viscosity of the final solution of the cellulose ethers which is to be worked up into shaped structures, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, the solution exhibits from the first the desired viscosity that is without maturing, the maturing is superfluous. Now, as the viscosities of the different kinds of cellulose on the market (linters and wood-pulp) differ very much from one another, the question of maturing depends in most cases on the one hand on the viscosity desired of the solution intended for the manufacture of shaped structures, and on the other hand on the viscosity of the kind of cellulose being worked.

Wherever the context permits, the expressions "alkali-soluble oxy-organo compound of cellulose," "alkali-soluble cellulose ether," "alkali-soluble cellulose ester," "cellulose ether which is soluble or at least partially soluble in caustic alkali solution," "cellulose ester which is soluble or at least partially soluble in caustic alkali solution," "oxy-organo compound of cellulose which is at least partially soluble in caustic alkali solution," "cellulose ether which is at least partially soluble in caustic solution" and "cellulose ester which is at least partially soluble in caustic alkali solution" are intended to include such simple and mixed cellulose ethers and such cellulose esters and such cellulose ether-esters as are completely or almost completely soluble in caustic alkali solution at room temperature and at a lower temperature, for example at a temperature between room temperature and 0° C. or lower and such simple and mixed cellulose ethers and such cellulose esters and such cellulose ether-esters as do not dissolve or do not completely dissolve in caustic alkali solution at room temperature, but as can be brought into solution or brought completely into solution therein by cooling their suspensions or incomplete solutions in caustic alkali solution to a temperature between room temperature and 0° C. or to 0° C. or to a temperature below 0° C. for example to minus 5° C. or to minus 10° C. or lower and then allowing the temperature to rise to 0° C. or above 0° C., for example to a temperature between 0° C. and 20° C., and such simple or mixed cellulose ethers and such cellulose esters and such cellulose ether-esters as do not dissolve or do not completely dissolve in caustic alkali solution at room temperature or at a temperature between room temperature and 0° C. or even at 0° C., but as can be brought into solution or brought completely into solution therein and remain in solution therein, at room temperature and/or at temperatures between room temperature and 0° C. or at 0° C., by cooling their suspensions or incomplete solutions to a temperature below 0° C., for example to minus 5° C. or minus 10° C. or lower and then allowing the temperature to rise to 0° C. or above 0° C., for example to room temperature.

The term "cellulose" used in the description and claims is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

The term "alkali cellulose," wherever the context permits, means alkali cellulose prepared in the usual manner, namely by steeping cellulose in caustic alkali solution and removing the excess of the latter by pressing, or by mixing cellulose with such an amount of caustic alkali solution or solid caustic alkali or mixture of solid caustic alkali with solutions thereof, as is desired to be present in the final alkali cellulose.

The expression "etherification" in the specification and claims covers alkylation or aralkylation or hydroxy-alkylation or production of hydroxy-acid derivatives, "ether" covers simple alkyl and aralkyl and hydroxy-alkyl and hydroxy-acid ethers and also mixed ethers, for example the mixed ethers set forth in the above paragraph headed "Mixed ethers," "etherifying agents" covers alkylating and aralkylating and hydroxy-alkylating agents and halogen fatty acids and their salts and esters.

The term "hydroxy-alkyl" is intended to include the halogenated or non-halogenated radicals of di- or polyvalent alcohols in conjunction with one or more oxygens or hydroxyls.

Wherever the context permits, the terms "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups. Compounds produced as in my copending case Patent 2,095,524 are also included within these terms.

The term "hydroxy-alkylating agents" is intended to include halogen derivatives of di- or polyhydric alcohol particularly halohydrins, such as monohalohydrins and alkylene oxides.

The expression "artificial structures" or "shaped structures" used in the specification and claims is intended to include: Artificial threads, particularly artificial silk and staple fibre, artificial hair, artificial straw; film of every kind, bands and plates of every kind; plastic masses of any description; adhesives and cements; finishes, coatings and layers of every kind particularly such as are applicable in finishing, filling and dressing of textile fabrics, sizing of yarn, thickening agents or fixing agents for pigments in textile printing and the like; paper-like surfacing, paper-sizing; in the manufacture of artificial leather or of book cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

The expression "textile material" in the specification and claims includes, wherever the context permits, any spun or woven textile fibres, whether animal or vegetable (for example, flax, linen, hemp, ramie, jute, wool and particularly cotton, as well as artificial fibres of any kind in the form of yarn, staple fibre or fabrics consisting of, or containing artificial fibres) in the form of pure fabrics or in the form of mixed fabrics or in the form of yarn in skeins, cops or warps.

What I claim is:

1. A process of making a shaped cellulosic structure which comprises the step of coagulating such shaped artificial structure from a shaped solution of an oxy-organo compound of cellulose in caustic soda solution by means of an aqueous bath which is incapable of neutralizing any substantial proportion of the caustic alkali contained in the shaped solution, such compound of cellulose being substantially insoluble in water.

2. A process of producing shaped artificial structures which comprises shaping a solution of an alkali soluble oxy-organo compound of cellulose in a caustic alkali solution, said compound of cellulose being substantially insoluble in water, and coagulating the shaped mass by diluting with water the alkali hydroxide thereof and without substantial neutralization of the said caustic alkali.

3. A process which comprises introducing a shaped caustic alkali solution of a substantially water-insoluble oxy-organo compound of cellulose into a bath of water and removing the caustic alkali therefrom mainly by the solvent action of water on said caustic alkali.

4. In making artificial shaped cellulosic structures the steps of introducing a shaped solution of an oxy-organo compound of cellulose in a caustic alkali solution, which compound of cellulose is water insoluble, into water which is free from acids and free from salts than can neutralize alkalies, and removing the caustic alkali from said shaped solution as such and without converting the said alkali into a salt.

LEON LILIENFELD.